May 29, 1956    R. J. IFIELD    2,747,596
LIQUID SUPPLY AND FLOW REGULATING MEANS
Filed Aug. 11, 1952
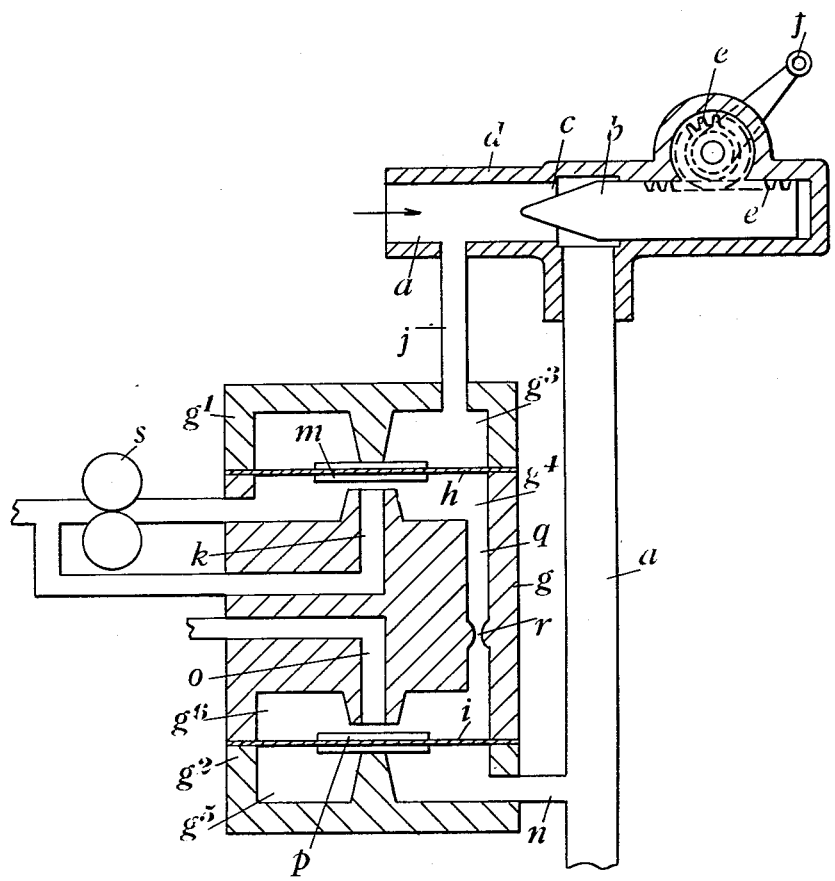
Inventor
R. J. Ifield

United States Patent Office 2,747,596
Patented May 29, 1956

2,747,596

LIQUID SUPPLY AND FLOW REGULATING MEANS

Richard Joseph Ifield, Dural, New South Wales, Australia, assignor to Joseph Lucas (Industries) Limited, Birmingham, England Application August 11, 1952, Serial No. 303,764

1 Claim. (Cl. 137—100)

In apparatus for controlling the supply of liquid fuel from a pump to a prime mover, it is known to employ in association with a servo-mechanism for varying the output of the pump, a liquid-operable regulating means responsive to the rate of fuel flow from the pump to the prime mover. Hitherto the liquid for actuating the regulating means has been fuel by-passed from the main flow of fuel supplied to the prime mover by the pump, and is subsequently wasted.

The object of the present invention is to enable such fuel wastage to be avoided by the provision of a liquid supply and flow regulating means through the medium of which the fuel regulating means can be actuated by an auxiliary liquid flow which is derived from a source independent of the fuel supply pump, but which in magnitude is at all times strictly proportional to the main fuel flow from the pump to the prime mover, so that any variation in the main fuel flow can be corrected by the fuel regulating means in response to proportional variation of the auxiliary liquid flow.

A liquid supply and regulating means in accordance with the invention comprises in combination a first chamber, a first flexible diaphragm dividing the first chamber into first and second compartments, a second chamber, a second flexible diaphragm dividing the second chamber into first and second compartments, a passage for admitting liquid under variable pressure to the first compartment of the first chamber, a second passage for admitting liquid under a variable pressure, lower than that of the liquid admitted through the first passage to the first compartment of the first chamber, to the first compartment of the second chamber, a restricted passage interconnecting the second compartments of the first and second chambers, a pump for supplying liquid under pressure to the second compartment of the second chamber, and thence through the restricted passage to the second compartment of the second chamber, a first liquid outlet leading from the second compartment of the first chamber, a valve member operable by the first diaphragm for controlling communication between the last mentioned compartment and the first liquid outlet, a second liquid outlet leading from the second compartment of the second chamber, and a second valve member operable by the second diaphragm for controlling liquid flow from the last mentioned compartment to the second liquid outlet, whereby liquid flow through the second outlet is proportional to the difference between the liquid pressures in the first compartments of the two chambers.

The accompanying drawing illustrates diagrammatically one embodiment of the present invention applied to a throttle-controlled conduit of a liquid fuel supply system.

Referring to the drawing, there is shown a conduit $a$ through which liquid fuel can flow from a pump (not shown) to a prime mover (also not shown). In this conduit is arranged an adjustable throttle for setting up a variable pressure difference in the conduit. In the example shown, the throttle comprises an axially slidable plug $b$ co-operating with an orifice $c$ situated between the inlet and outlet of a hollow body part $d$, the plug being adjustable relatively to the said orifice through a rack-and-pinion mechanism $e$ by a lever $f$. In association with the conduit $a$ is provided a hollow member $g$ containing two shallow chambers $g^1$, $g^2$, the chamber $g^1$ being divided into two compartments $g^3$, $g^4$, by a flexible diagraph $h$, and the chamber $g^2$ being likewise divided into two compartments $g^5$, $g^6$ by a flexible diaphragm $i$. The compartment $g^3$ in the first chamber is in communication by way of a passage $j$ with the conduit $a$ at the inlet side of the throttle. The other compartment $g^4$ of the first chamber is provided with an outlet $k$ leading to a sump or the inlet side of a pump $s$ or other region of low pressure, and this outlet is controlled by a valve member $m$ on the associated diaphragm.

The compartment $g^5$ of the second chamber is in communication by way of a passage $n$ with the conduit $a$ at the outlet side of the throttle, and the other compartment $g^6$ of this chamber is provided with an outlet $o$ leading to any convenient liquid operated mechanism (not shown) for controlling the rate of supply of fuel to the conduit, this outlet being controlled by a valve member $p$ on the associated diaphragm.

Also the two compartments $g^4$, $g^6$, containing the said outlets and valve members are in commmunication with each other by way of a passage $q$ having therein a restricted orifice $r$, and this passage is in communication at one end with the delivery side of the pumps. The latter may be of any convenient kind which is driven by the prime mover, an electric motor or other source and is supplied from the above mentioned sump or other convenient source, the pump being in communication with that side of the restricted orifice $r$ which is adjacent to the compartment $g^4$ having the above mentioned outlet $k$. It is not necessary for the pump $s$ to have a constant output since any variation of its output is compensated by movement of the valve member $m$.

The two diaphragms $h$, $i$ are both subjected (at different relative pressures determined by the restricted orifice $r$) to the liquid supplied by the pump, and whereas the diaphragm $h$ is also subjected to the opposing pressure at the inlet side of the throttle, the other diaphragm $i$ is subjected to the opposing pressure at the outlet side of the throttle.

The action of the apparatus is such that in the event of, for example, an increase of pressure at the inlet side of the throttle, the diaphragm $h$ subject to that pressure closes the passage $k$ leading to the sump and causes the delivery pressure of the pump $s$ to rise to a corresponding extent. A change in pressure at the outlet side of the throttle will be accompained by a corresponding movement of the associated valve $p$ so that the pressure at the outlet side of the restricted orifice $r$ will be correlated with that at the outlet side of the throttle. Thus any change in flow in the main conduit $a$ is accompanied by a corresponding change in flow from the pump $s$ through the restricted orifice $r$ and the outlet $o$ to the fuel regulating means, the flow through this outlet being proportional to the pressure difference between opposite sides of the throttle.

Having thus described my invention what I claim as new and desire to secure by Letters Patent is:

A liquid supply and flow regulating means comprising in combination a first chamber, a first flexible diaphragm dividing the first chamber into first and second compartments, a second chamber, a second flexible diaphragm dividing the second chamber into first and second compartments, a passage for admitting liquid under variable pressure to the first compartment of the first chamber, a second passage for admitting liquid under a variable pressure, lower than that of the liquid admitted through the first passage to the first compartment of the first chamber, to the first compartment of the second chamber, a restricted passage interconnecting the second compartments of the first and second chambers, a pump for supplying liquid under pressure to the second compartment of the first chamber, and thence through the restricted passage to the second compartment of the second chamber, a liquid pressure relief outlet leading from the second compartment of the first chamber, a first valve member operable by the first diaphragm for controlling communication between the last mentioned compartment and the liquid pressure relief outlet so that variation of liquid pressure in the first compartment of the first chamber is accompanied by movement of the first valve member for causing a proportional variation in the liquid pressure in the second compartment of the first chamber, a second liquid outlet leading from the second compartment of the second chamber, and a second valve member operable by the second diaphragm for controlling liquid flow from the last mentioned compartment to the second liquid outlet, whereby liquid flow through the second outlet is proportional to the difference between the liquid pressures in the first compartments of the two chambers.

References Cited in the file of this patent

UNITED STATES PATENTS

| | | |
|---|---|---|
| 2,536,158 | Chamberlin | Jan. 2, 1951 |
| 2,605,709 | Jubb | Aug. 5, 1952 |
| 2,669,249 | Wittmann | Feb. 16, 1954 |